(12) United States Patent
Hung

(10) Patent No.: US 11,654,331 B2
(45) Date of Patent: May 23, 2023

(54) MOTION SENSING DATA COLLECTING SYSTEM

(71) Applicant: Chia-Chieh Hung, Taoyuan (TW)

(72) Inventor: Chia-Chieh Hung, Taoyuan (TW)

( * ) Notice: Subject to any disclaimer, the term of this patent is extended or adjusted under 35 U.S.C. 154(b) by 267 days.

(21) Appl. No.: 17/124,416

(22) Filed: Dec. 16, 2020

(65) Prior Publication Data

US 2021/0197025 A1 Jul. 1, 2021

(30) Foreign Application Priority Data

Dec. 26, 2019 (TW) .................................. 108217316

(51) Int. Cl.
| | |
|---|---|
| *A63B 24/00* | (2006.01) |
| *G06F 3/01* | (2006.01) |
| *G06F 3/14* | (2006.01) |
| *A63B 71/06* | (2006.01) |

(52) U.S. Cl.
CPC ...... *A63B 24/0062* (2013.01); *A63B 24/0075* (2013.01); *A63B 71/0622* (2013.01); *G06F 3/011* (2013.01); *G06F 3/017* (2013.01); *G06F 3/14* (2013.01); *A63B 2071/065* (2013.01); *A63B 2220/803* (2013.01); *A63B 2220/836* (2013.01); *A63B 2230/75* (2013.01); *A63B 2244/10* (2013.01); *A63B 2244/22* (2013.01)

(58) Field of Classification Search
CPC ............ A63B 24/0062; A63B 24/0075; A63B 71/0622; A63B 2220/803; A63B 2220/836; A63B 2230/75; G06F 3/011; G06F 3/017; G06F 3/14; A62B 2244/10; A62B 2244/22
See application file for complete search history.

(56) References Cited

U.S. PATENT DOCUMENTS

| | | | | |
|---|---|---|---|---|
| 9,811,639 | B2 * | 11/2017 | Aragones | G09B 19/0076 |
| 2012/0052946 | A1 * | 3/2012 | Yun | G02B 27/017 463/32 |
| 2014/0024971 | A1 * | 1/2014 | Bunn | A61B 5/1124 600/595 |
| 2017/0291086 | A1 * | 10/2017 | Lee | A63F 13/213 |
| 2019/0163270 | A1 * | 5/2019 | Da Silva | A61B 5/744 |
| 2019/0208007 | A1 * | 7/2019 | Khalid | H04L 67/1021 |
| 2019/0235746 | A1 * | 8/2019 | Hatano | G06F 3/011 |
| 2019/0374816 | A1 * | 12/2019 | Yun | A61B 5/742 |

* cited by examiner

*Primary Examiner* — Jay Trent Liddle
*Assistant Examiner* — Alyssa N Brandley
(74) *Attorney, Agent, or Firm* — Sinorica Patent & Trademark Office

(57) ABSTRACT

A motion sensing data collecting system including: a plurality of user terminal ends each having a wearable sensing device for sensing a set of motion data of a motion combination; and a central control platform communicating with the user terminal ends via an internet to enable the user terminal ends to upload plural sets of motion data of the motion combinations, where the plural sets of motion data are stored in a memory unit, and one set of motion data corresponding to an aforementioned motion combination required by a user terminal end will be selected from the plural sets of motion data and sent to the user terminal end.

4 Claims, 3 Drawing Sheets

MOTION SENSING DATA COLLECTING SYSTEM

BACKGROUND OF THE INVENTION

1. Field of the Invention

The present invention relates to a data sharing platform, especially to a motion sensing data collecting system.

2. Description of Related Art

A conventional data sharing platform using the internet allows users to download videos for watching or learning a certain skill, for example singing, dancing or foreign language.

However, the conventional data sharing platform can only share texts, voices, images or videos; when a user wants to learn a motion combination displayed in a video, because the conventional video is unable to provide a three-dimensional motion data, the user can only guess the actual three-dimensional motion through the two-dimensional images. Moreover, the videos shared in the conventional date sharing platform would not provide a warm-up motion corresponding to the motion combination or the exercising muscle strength, so that a possible of exercising injury may happen. In addition, the conventional data sharing platform is not provided with the physiological data, for example height, weight, weight of skeletal muscle, weight of body fat, muscle balance, age and gender, of individual user, so that the shared video is unable to provide a precise value of calories to be burned when the individual user practices the motion combination. In other words, data shared in the conventional data sharing platform is not practical thereby causing the user being unable to effectively learn.

For solving the above-mentioned problems, a novel motion sensing data collecting system shall be provided.

SUMMARY OF THE INVENTION

One primary objective of the present invention is to provide a motion sensing data collecting system, in which the motion sensing data of a motion combination can be uploaded and downloaded in a public platform by a group of users having the same exercising interests, so that the users can share the exercising experiences with each other.

Another objective of the present invention is to provide a motion sensing data collecting system, in which a central control platform is able to generate a set of corresponding warm-up motion with respect to sensing data sensed by a plurality of related sensing nodes according to a motion combination, and the set of corresponding warm-up motion is sent to a user for preventing the user from having exercising injury.

Another objective of the present invention is to provide a motion sensing data collecting system, in which a central control platform is able to generate a motion difficulty notification with respect to sensing data sensed by a plurality of related sensing nodes according to a motion combination, so that a user, who has downloaded the motion combination, can be notified so as to decide to practice the motion combination or not.

Another objective of the present invention is to provide a motion sensing data collecting system, in which a central control platform is able to calculate a value of calories burned by a body with respect to sensing data sensed by a plurality of related sensing nodes according to a motion combination and physiological data of a user, for example height, weight, weight of skeletal muscle, weight of body fat, muscle balance, age and gender, and the value of calories burned by the body is sent to a user for allowing the user to be aware of his/her physiological condition.

Still another objective of the present invention is to provide a motion sensing data collecting system, in which a central control platform is able to determine exercising muscles and the exercising strength with respect to sensing data sensed by a plurality of related sensing nodes according to a motion combination, so that effects of effectively enhancing the certain muscles desired to be exercised by a user and reducing a possibility of exercising injury are provided.

For achieving said objective, one technical solution provided by the present invention is to provide a motion sensing data collecting system, which includes:

a plurality of user terminal ends, having a wearable sensing device and a communication interface respectively, wherein the wearable sensing device is served to be worn by a user and used for sensing a set of motion data when the user practices a motion combination; and a central control platform, communicating with the communication interfaces of the plurality of user terminal ends via an internet for allowing each of the user terminal ends to upload the motion data of the motion combination, wherein the plurality sets of motion data are stored in a memory unit, one of the plurality sets of motion data corresponding to the motion combination is selected from the plurality sets of motion data stored in the memory unit with respect to a requirement of each of the user terminal ends so as to be sent to each of the user terminal ends, thus each of the user terminal ends is able to be provided with the desired motion combination capable of being displayed on a display screen.

For possible embodiments, the wearable sensing unit has a plurality of sensing nodes, and each of the sensing nodes is able to provide sensing data, and the sensing data can be location data, speed data or accelerating speed data.

According to one embodiment, the central control platform is able to generate a set of corresponding warm-up motion with respect to the sensing data sensed by the plurality of related sensing nodes according to the motion combination, and the set of corresponding warm-up motion is sent to the user terminal end.

According to one embodiment, the central control platform is able to generate a motion difficulty notification with respect to the sensing data sensed by the plurality of related sensing nodes according to the motion combination, and the motion difficulty notification includes an easy, a moderate, a difficult and a danger notification.

According to one embodiment, the central control platform is able to calculate a value of calories burned by a body with respect to the sensing data sensed by the plurality of related sensing nodes according to the motion combination, and the value of calories burned by the body is sent to the user for allowing the user to be aware of a physiological condition thereof.

According to one embodiment, the central control platform is able to calculate a value of calories burned by a body with respect to the sensing data sensed by the plurality of related sensing nodes according to the motion combination and physiological data of a user, and the value of calories burned by the body is sent to the user, wherein the physiological data includes information of at least one element in a group consisting of height, weight, weight of skeletal muscle, weight of body fat, muscle balance, age and gender.

According to one embodiment, the central control platform is able to determine exercising muscles and an exercising strength with respect to the sensing data sensed by the plurality of related sensing nodes according to the motion combination For possible embodiments, the motion combination can be gymnastics, dances, martial arts, ball games, non-ball games or professional skilled operations.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
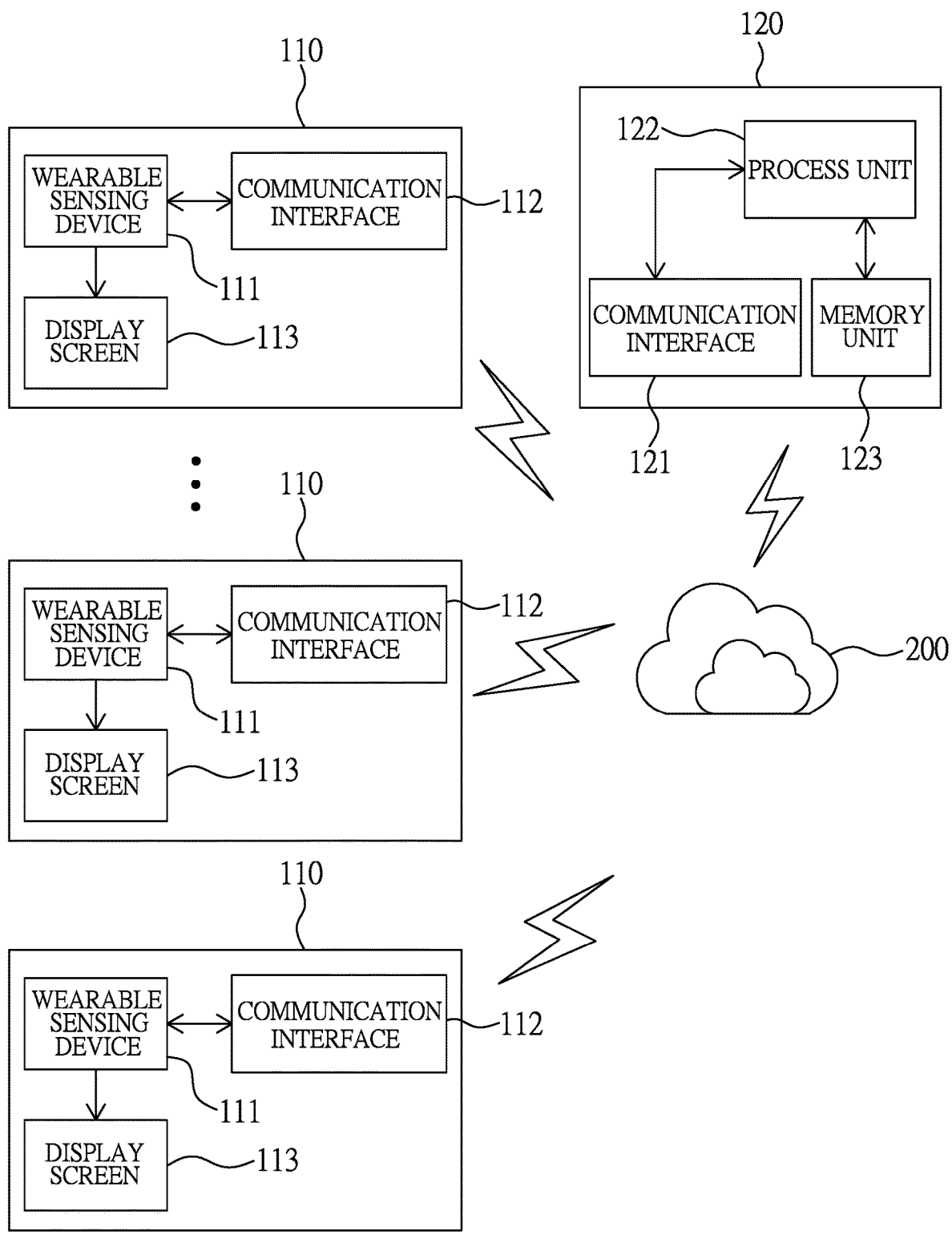
FIG. 1 is a block diagram illustrating a motion sensing data collecting system according to one embodiment of the present invention.

Please refer to FIG. 1, which is a block diagram illustrating a motion sensing data collecting system according to one embodiment of the present invention.

As shown in FIG. 1, the present invention provides a motion sensing data collecting system, which includes a plurality of user terminal ends 110 and a central control platform 120. Wherein, the plurality of user terminal ends 110 are in communication with the central control platform 120 via an internet 200.

Each of the user terminal ends 110 has a wearable sensing device 111, a communication interface 112 and a display screen 113. Wherein, the wearable sensing device 111 is served to be worn by a user and used for sensing a set of motion data when the user performs a motion combination. The communication interface 112 is used for being connected to the internet 200 so as to be in communication with the central control platform 120.

The central control platform 120 has a communication interface 121, a process unit 122 and a memory unit 123. The communication interface 121 is used for being connected to the internet 200 so as to be in communication with the communication interfaces 112 of the plurality of user terminal ends 110. The process unit 122 is used for processing data uploaded from the plurality of user terminal ends 110. The memory unit 123 is used for storing the uploaded data of the plurality of user terminal ends 110.

When being operated, the motion data of the motion combination uploaded by each of the user terminal ends 110 is stored in a memory unit through the process unit 122; a set of motion data corresponding to the motion combination is selected from the plurality sets of motion data stored in the memory unit 132 with respect to a requirement of each of the user terminal ends 110 so as to be sent to each of the user terminal ends 110, thus each of the user terminal ends 110 is able to be provided with a desired motion combination capable of being displayed on the display screen 113.

In addition, the wearable sensing unit 111 has a plurality of sensing nodes, and each of the sensing nodes is able to provide sensing data, and the sensing data can be location data, speed data or accelerating speed data.

Figure 2:
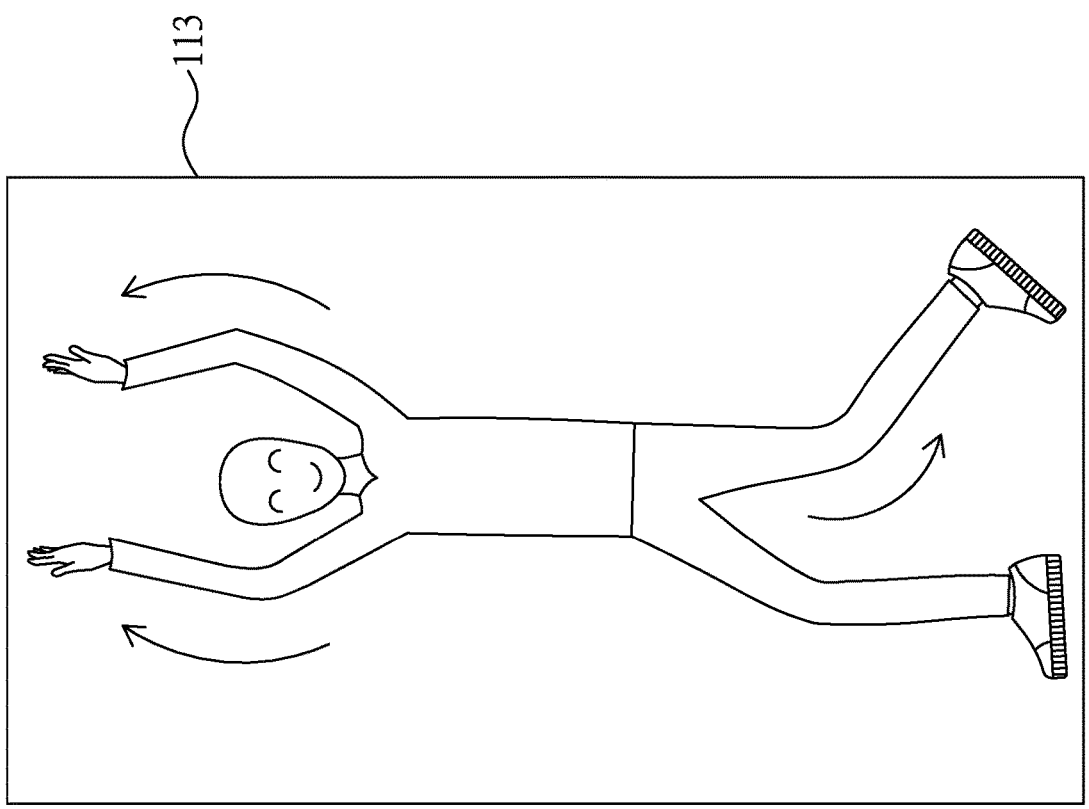
FIG. 2 is a schematic view illustrating the motion sensing data collecting system of FIG. 1 providing a warm-up motion in a downloaded image being displayed on a display screen of a user terminal end.

In addition, the central control platform 120 is able to generate a set of corresponding warm-up motion with respect to the sensing data sensed by the plurality of related sensing nodes according to a motion combination, and the set of corresponding warm-up motion is sent to the user terminal end 110. Please refer to FIG. 2, which is a schematic view illustrating the warm-up motion in a downloaded image being displayed on the display screen 113 of the user terminal end 100.

Figure 3:
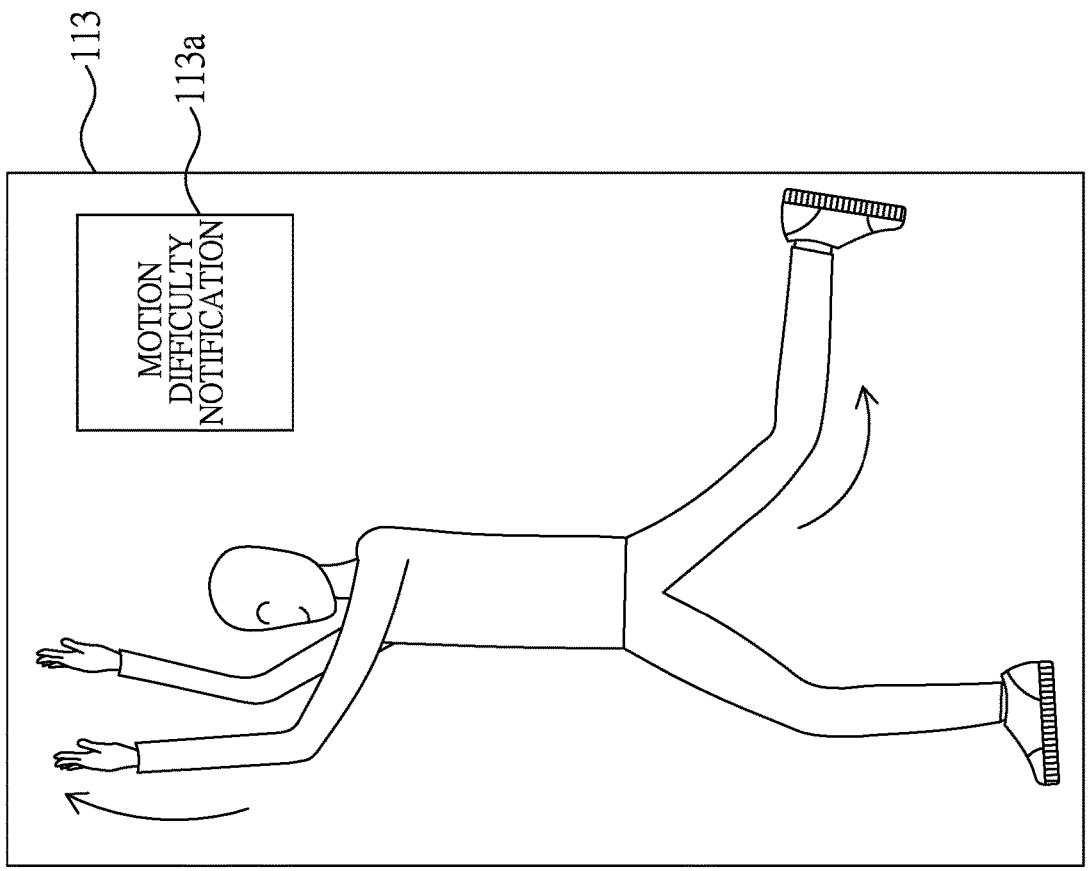
FIG. 3 is a schematic view illustrating the motion sensing data collecting system of FIG. 1 providing a motion difficulty notification in a downloaded image being displayed on a display screen of a user terminal end.

In addition, the central control platform 120 is able to generate a motion difficulty notification 113a with respect to the sensing data sensed by the plurality of related sensing nodes according to a motion combination, and the motion difficulty notification 113a includes an easy, a moderate, a difficult and a danger notification. Please refer FIG. 3, which is a schematic view illustrating the motion difficulty notification 113a in a downloaded image being displayed on the display screen 113 of the user terminal end 110.

Figure 4:
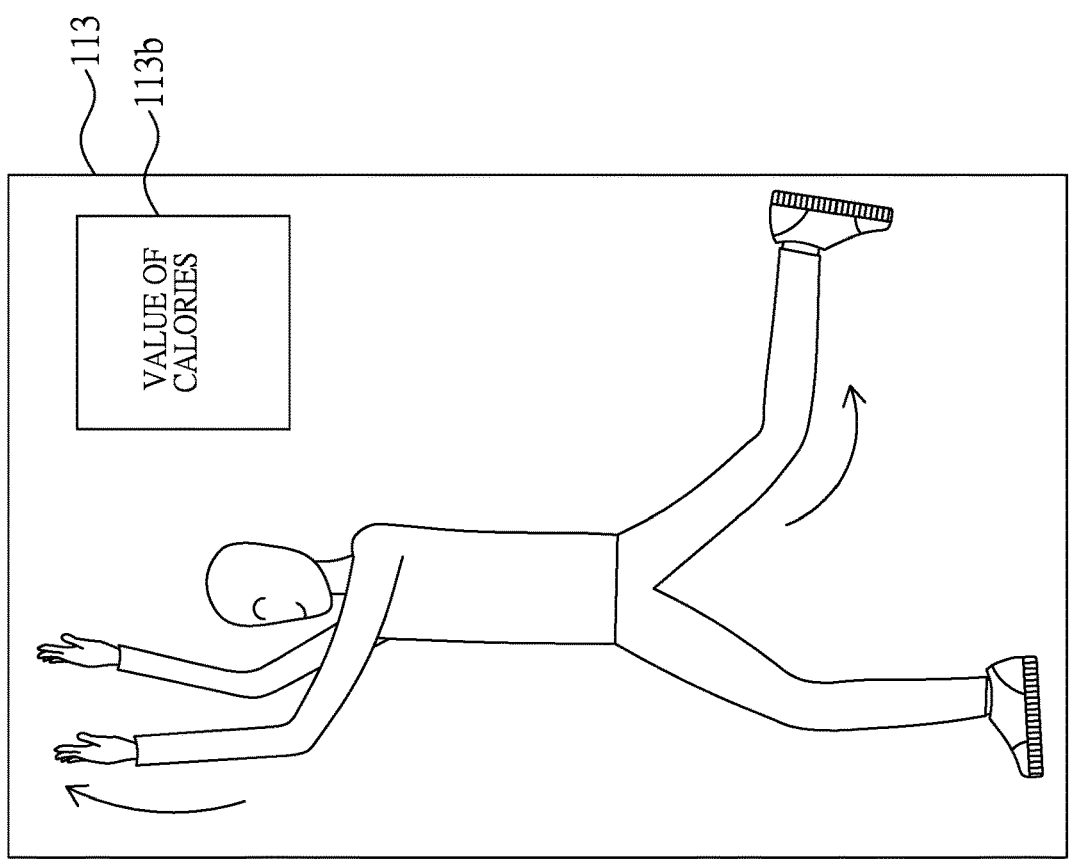
FIG. 4 is a schematic view illustrating the motion sensing data collecting system of FIG. 1 providing a value of calories burned by a body in a downloaded image being displayed on a display screen of a user terminal end.

In addition, the central control platform 120 is able to calculate a value of calories burned by a body with respect to the sensing data sensed by the plurality of related sensing nodes according to a motion combination, and the value of calories burned by the body is sent to the user terminal end 110. Please refer to FIG. 4, which is a schematic view illustrating the value of calories 113b burned by the body in a downloaded image being displayed on the display screen 113 of the user terminal end 110. In possible embodiments, the central control platform 120 is able to calculate a value of calories burned by a body with respect to the sensing data sensed by the plurality of related sensing nodes according to a motion combination, and the value of calories burned by the body is sent to the user terminal end 110, wherein the central control platform 120 is able to adjust a calculation manner with respect to physiological parameters (for example height, weight, weight of skeletal muscle, weight of body fat, muscle balance, age and gender) provided by each of the users for more precisely calculating the value of calories burned by the body of each of the users.

Figure 5:
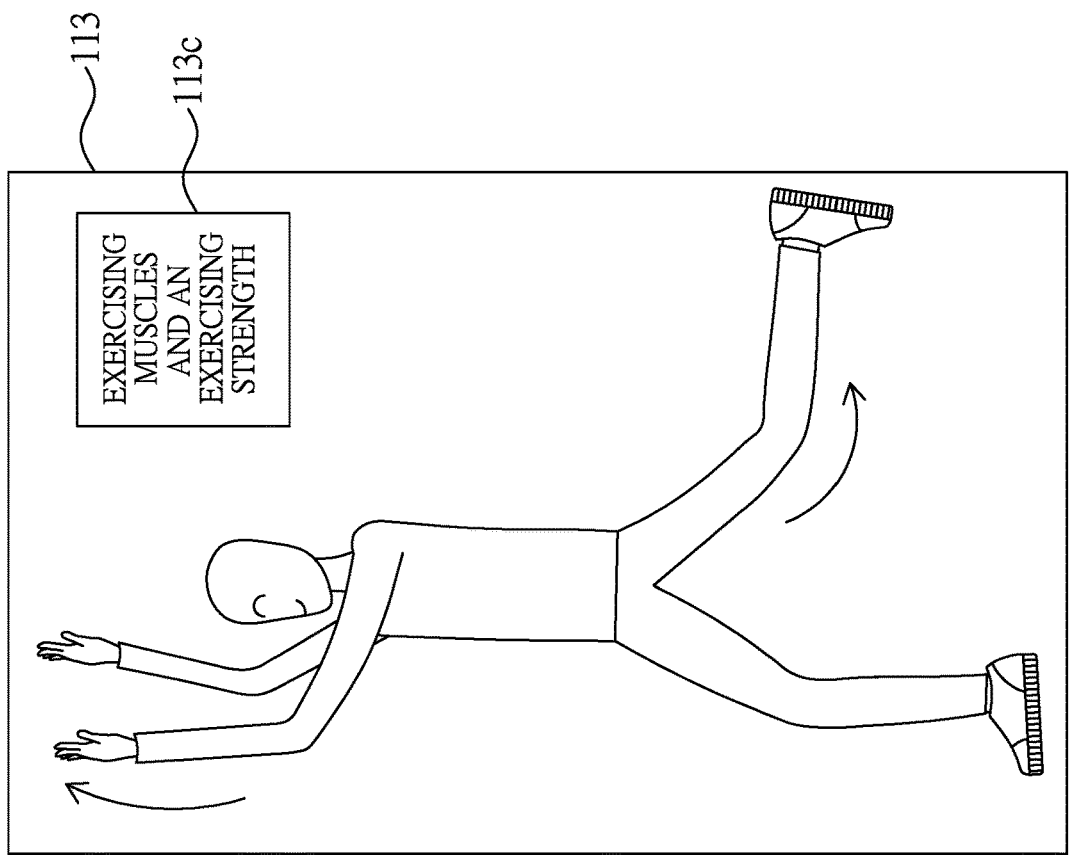
FIG. 5 is a schematic view illustrating the motion sensing data collecting system of FIG. 1 providing exercising muscles and an exercising strength in a downloaded image being displayed on a display screen of a user terminal end.

In addition, according to possible embodiments, the central control platform 120 is able to determine the exercising muscles and an exercising strength 113c with respect to the sensing data sensed by the plurality of related sensing nodes according to a motion combination, so that effects of effectively enhancing the certain muscles desired to be exercised by the user and reducing a possibility of exercising injury are provided. Please refer to FIG. 5, which is schematic view illustrating the exercising muscles and the exercising strength 113c in a downloaded image being displayed on the display screen 113 of the user terminal end 110.

In addition, according to possible embodiments, the motion combination can be gymnastics, dances, martial arts, ball games, non-ball games or professional skilled operations; wherein, the professional skilled operations can be various skilled operations according to various occupations.

In addition, the central control platform can further send the motion data to a cloud server, which is used to detect and memorize a behavior pattern from the motion data.

In addition, the cloud server can further have an expert system to detect a behavior pattern from the motion data of a user and perform a judgement on the behavior pattern for at least one disease discovery or for at least one training purpose, or perform a judgement on the behavior pattern and corresponding physiological data for at least one disease discovery or for at least one training purpose, where the corresponding physiological data is derived from the user by using additional sensors.

In addition, as an alternative embodiment, the motion sensing data collecting system of the present invention can be implemented by an edge computing architecture, the edge computing architecture including a plurality of user terminal ends and a central control platform, the user terminal ends each having a wearable sensing device served to be worn by a user and used for sensing a motion of the user and communicating with the central control platform, and the edge computing architecture being used to perform steps as follows: deriving a set of motion data of a motion combination of each said user; storing each said set of motion data in a memory unit; and sending a required set of motion data from the memory unit to one said user to display a desired said motion combination on a display screen for the one said user to reference.

Preferably, the edge computing architecture can include an expert system to detect a behavior pattern from the motion data and perform a judgement on the behavior pattern for at least one disease discovery or for at least one training purpose; or detect a behavior pattern from the motion data and perform a judgement on the behavior pattern and corresponding physiological data for at least one disease discovery or at least one training purpose, where the corresponding physiological data is derived from the user by using additional sensors.

Based on what has been disclosed above, advantages achieved by the present invention are as follows.

1. With the motion sensing data collecting system provided by the present invention, the motion sensing data of a motion combination can be uploaded and downloaded in a public platform by a group of users having the same exercising interests, so that the users can share the exercising experiences with each other.
2. With the motion sensing data collecting system provided by the present invention, the central control platform is able to generate the set of corresponding warm-up motion with respect to the sensing data sensed by the plurality of related sensing nodes according to a motion combination, and the set of corresponding warm-up motion is sent to the user terminal end for preventing the user from having exercising injury.
3. With the motion sensing data collecting system provided by the present invention, the central control platform is able to generate the motion difficulty notification with respect to the sensing data sensed by the plurality of related sensing nodes according to a motion combination, so that the user, who has downloaded the motion combination, can be notified so as to decide to practice the motion combination or not.
4. With the motion sensing data collecting system provided by the present invention, the central control platform is able to calculate the value of calories burned by the body with respect to the sensing data sensed by the plurality of related sensing nodes according to a motion combination, and the value of calories burned by the body is sent to the user for allowing the user to be aware of his/her physiological condition.
5. With the motion sensing data collecting system provided by the present invention, the central control platform is able to determine the exercising muscles and the exercising strength with respect to the sensing data sensed by the plurality of related sensing nodes according to a motion combination, so that effects of effectively enhancing the certain muscles desired to be exercised by the user and reducing a possibility of exercising injury are provided.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A motion sensing data collecting system, including:
   a plurality of user terminal ends, each having a wearable sensing device and a communication interface respectively, wherein said wearable sensing device is served to be worn by a user and used for sensing a set of motion data of a motion combination of said user when said user practices the motion combination; and
   a central control platform, communicating with said communication interface of each said plurality of user terminal ends via an Internet for allowing each said user terminal end to upload said set of motion data of said motion combination, wherein plural sets of motion data are stored in a memory unit, one of said plural sets of motion data corresponding to said motion combination is selected from said plural sets of motion data stored in said memory unit with respect to a requirement of each said user terminal end so as to be sent to each said user terminal end, thus each said user terminal end is able to be provided with a desired said motion combination capable of being displayed on a display screen;
   wherein said wearable sensing unit has a plurality of sensing nodes, and each of said plurality of sensing nodes is able to provide sensing data, and said sensing data is selected from a group consisting of location data, speed data and accelerating speed data;
   wherein said central control platform is able to generate a set of corresponding warm-up motion with respect to said sensing data sensed by each said plurality of sensing nodes according to said motion combination, and said set of corresponding warm-up motion is sent to one said user;
   wherein said central control platform is able to generate a motion difficulty notification with respect to said sensing data sensed by each said plurality of sensing nodes according to said motion combination;
   wherein said central control platform is able to calculate a value of calories burned by a body with respect to said sensing data sensed by each said plurality of sensing nodes according to said motion combination and physiological data of one said user, and said value of calories burned by said body is sent to the one said user, wherein said physiological data includes information of at least one element in a group consisting of height, weight, weight of skeletal muscle, weight of body fat, muscle balance, age and gender;

wherein said central control platform is able to send the motion data to a cloud server, and the cloud server is used to detect and memorize a behavior pattern from the motion data; and wherein the cloud server has an expert system to detect a behavior pattern from the motion data and perform a judgement on the behavior pattern and corresponding physiological data of said user for at least one disease discovery or for at least one training purpose.

2. The motion sensing data collecting system as claimed in claim 1, wherein said central control platform is able to determine exercising muscles with respect to said sensing data sensed by each said plurality of related said sensing nodes according to said motion combination.

3. The motion sensing data collecting system as claimed in claim 1, wherein said motion combination is selected from a group consisting of a motion combination of gymnastics, a motion combination of dances, a motion combination of martial arts, a motion combination of ball games, a motion combination of non-ball games or a motion combination of various skilled operations according to various occupations.

4. A motion sensing data collecting system implemented by an edge computing architecture, the edge computing architecture including a plurality of user terminal ends and a central control platform, the plurality of user terminal ends each having a wearable sensing device served to be worn by a user and used for sensing a motion of the user and communicating with the central control platform, and the edge computing architecture being used to perform steps as follows:

deriving a set of motion data of a motion combination of each said user when said user practices the motion combination;

storing each said set of motion data in a memory unit; and sending a required set of motion data from the memory unit to one said user to display a desired said motion combination on a display screen for the one said user to reference;

wherein the edge computing architecture has an expert system to detect a behavior pattern from the motion data and perform a judgement on the behavior pattern and corresponding physiological data of said user for at least one disease discovery or at least one training purpose.

* * * * *